(12) United States Patent
Wang et al.

(10) Patent No.: US 6,444,281 B1
(45) Date of Patent: Sep. 3, 2002

(54) VACUUM IG WINDOW UNIT WITH SPACERS BETWEEN FIRST AND SECOND EDGE SEALS

(75) Inventors: Yei-Ping H. Wang, Troy; Scott V. Thomsen, Milford, both of MI (US)

(73) Assignee: Guardian Industries Corp., Auburn Hills, MI (US)

( * ) Notice: Subject to any disclaimer, the term of this patent is extended or adjusted under 35 U.S.C. 154(b) by 0 days.

(21) Appl. No.: 09/576,904

(22) Filed: May 23, 2000

Related U.S. Application Data

(63) Continuation-in-part of application No. 09/422,244, filed on Oct. 21, 1999, now Pat. No. 6,291,036, and a continuation-in-part of application No. 09/416,886, filed on Oct. 13, 1999.

(51) Int. Cl.[7] .............................. E06B 3/24; B32B 1/04
(52) U.S. Cl. ............................. 428/34; 428/69; 428/76; 52/786.13
(58) Field of Search .............................. 428/34, 69, 76, 428/120, 192; 52/786.13

(56) References Cited

U.S. PATENT DOCUMENTS

| | | |
|---|---|---|
| 49,167 A | 1/1865 | Stetson |
| 1,370,974 A | 3/1921 | Kirlin |
| 1,448,351 A | 3/1923 | Kirlin |
| 1,774,860 A | 9/1930 | Wendler et al. |
| 2,011,557 A | 8/1935 | Anderegg |
| 2,303,897 A | 12/1942 | Smith |
| 2,962,409 A | 11/1960 | Ludlow et al. |
| 3,441,924 A | 4/1969 | Peek et al. |
| 3,742,600 A | 7/1973 | Lowell |
| 3,902,883 A | 9/1975 | Bayer |
| 3,912,365 A | 10/1975 | Lowell |
| 3,936,553 A | 2/1976 | Rowe |

(List continued on next page.)

FOREIGN PATENT DOCUMENTS

| | | |
|---|---|---|
| EP | 0 831 073 | 10/1999 |
| FR | 2 482 161 | 11/1981 |
| JP | 11021150 | 1/1999 |
| JP | 11049536 | 2/1999 |

OTHER PUBLICATIONS

International Search Report dated Sep. 19, 2001.
"Thermal Outgassing of Vacuum Glazing" by Lenzen, et al., School of Physics, Univ. of Sydney, NSW 2006, Australia.
"Temperature –Induced Stresses in Vacuum Glazing: Modelling and Experimental Validation" by Simko, et al., Solar Energy, vol. 63, No. 1, pp. 1–21, 1998.
"Current Status of the Science and Technology of Vacuum Glazing" by Collins, et al., Solar Energy, vol. 62, No. 3, pp. 189–213, 1998.
"Fabrication of Evacuated Glazing at Low Temperature" by Griffiths, et al., Solar Energy, vol. 63, No. 4, pp. 243–249, 1998.
U.S. patent application Ser. No. 09/303,550, filed May 3, 1999.
U.S. patent application Ser. No. 09/404,659, filed Sep. 24, 1999.
U.S. patent application Ser. No. 09/422,244 filed Oct. 21, 1999.
U.S. patent application Ser. No. 09/416,886 filed Oct. 13, 1999.

Primary Examiner—Donald J. Loney
(74) Attorney, Agent, or Firm—Nixon & Vanderhye P.C.

(57) ABSTRACT

A vacuum insulating (IG) unit and method of making the same. A low pressure space is provided between opposing substrates. An edge sealing system includes at least first and second edge seals. A plurality of spacers or pillars are located at least partially between the first and second edge seals, in order to better control the gap or spacing between the two opposing substrates.

13 Claims, 3 Drawing Sheets

U.S. PATENT DOCUMENTS

| | | |
|---|---|---|
| 3,990,201 A | 11/1976 | Falbel |
| 4,064,300 A | 12/1977 | Bhangu |
| 4,130,408 A | 12/1978 | Crossland et al. |
| 4,130,452 A | 12/1978 | Indri |
| 4,305,982 A | 12/1981 | Hirsch |
| 4,422,280 A | 12/1983 | Mertin et al. |
| 4,429,509 A | 2/1984 | Vachet et al. |
| 4,486,482 A | 12/1984 | Kobayashi et al. |
| 4,514,450 A | 4/1985 | Nowobilski et al. |
| 4,683,154 A | 7/1987 | Benson et al. |
| 4,786,344 A | 11/1988 | Beuther |
| 4,822,649 A | 4/1989 | Canaud et al. |
| 4,824,215 A | 4/1989 | Joseph et al. |
| 4,853,264 A | 8/1989 | Vincent et al. |
| 4,865,672 A | 9/1989 | Delbeck et al. |
| 4,874,461 A | 10/1989 | Sato et al. |
| 4,924,243 A | 5/1990 | Sato et al. |
| 4,928,448 A | 5/1990 | Phillip |
| 4,983,429 A | 1/1991 | Takayanagi et al. |
| 5,027,574 A | 7/1991 | Phillip |
| 5,106,663 A | 4/1992 | Box |
| 5,124,185 A | 6/1992 | Kerr et al. |
| 5,157,893 A | 10/1992 | Benson et al. |
| 5,175,975 A | 1/1993 | Benson et al. |
| 5,234,738 A | 8/1993 | Wolf |
| 5,247,764 A | 9/1993 | Jeshurun et al. |
| 5,270,084 A | 12/1993 | Parker |
| 5,315,797 A | 5/1994 | Glover et al. |
| 5,399,406 A | 3/1995 | Matsuo et al. |
| 5,489,321 A | 2/1996 | Tracy et al. |
| 5,494,715 A | 2/1996 | Glover |
| 5,499,128 A | 3/1996 | Hasegawa et al. |
| 5,596,981 A | 1/1997 | Soucy |
| 5,657,607 A | 8/1997 | Collins et al. |
| 5,664,395 A | 9/1997 | Collins et al. |
| 5,739,882 A | 4/1998 | Shimizu et al. |
| 5,855,638 A | 1/1999 | Demars |
| 5,891,536 A | 4/1999 | Collins et al. |
| 5,902,652 A | 5/1999 | Collins et al. |
| 6,049,370 A | 4/2000 | Smith, Jr. et al. |
| 6,291,036 B1 * | 9/2001 | Wang et al. .................. 428/34 |

\* cited by examiner

VACUUM IG WINDOW UNIT WITH SPACERS BETWEEN FIRST AND SECOND EDGE SEALS

This is a continuation-in-part (CIP) of U.S. Ser. No. 09/422,244 filed Oct. 21, 1999 now U.S. Pat. No. 6,291,036, and Ser. No. 09/416,886, filed Oct. 13, 1999, the disclosures of which are both hereby incorporated herein by reference.

This invention relates to a vacuum insulating glass (IG) unit, and a method of making the same. More particularly, this invention relates to a vacuum IG unit including a peripheral seal including at least one spacer.

RELATED APPLICATIONS

Commonly owned U.S. Ser. Nos. 09/303,550 entitled "VACUUM IG PILLAR WITH DLC COATING" filed May 3, 1999 now U.S. Pat. No. 6,326,067; Ser. No. 09/404,659 filed Sep. 24, 1999 entitled "VACUUM IG WINDOW UNIT WITH PERIPHERAL SEAL AT LEAST PARTIALLY DIFFUSED AT TEMPER" now U.S. Pat. No. 6,336,989; as well as Ser. Nos. 09/422,244 and 09/416,886 mentioned above, are all hereby incorporated herein by reference.

BACKGROUND

Vacuum IG units are known in the art. For example, see U.S. Pat. Nos. 5,664,395, 5,657,607, 5,891,536 and 5,902,652, the disclosures of which are all hereby incorporated herein by reference.

Prior art FIGS. 1–2 illustrate a conventional vacuum IG unit 1. IG unit 1 includes two spaced apart sheets of glass 2 and 3 which enclose an evacuated or low pressure space 11 therebetween. Glass sheets 2 and 3 are interconnected by peripheral or edge seal of fused solder glass 4 and an array of support pillars 5.

Pump out tube 6 is sealed by solder glass 7 to an aperture or hole which passes from an interior surface of glass sheet 2 to the bottom of recess 9. Cavity 8 in sheet 3 accommodates the stump of tube 6. A vacuum is attached to tube 6 (prior to the tube being sealed) so that the interior cavity 11 between sheets 2 and 3 can be evacuated to create a low pressure area. After evacuation, tube 6 is melted to seal the vacuum.

As illustrated in FIGS. 1–2, spacers or pillars 5 are typically provided between the glass sheets 2 and 3 through the viewing area of the unit, but not at edges thereof where peripheral or edge seal 4 is located. This results in the thickness of gap or space 11 potentially varying from one thickness near the edge (s) of the glass sheet (s) to a different thickness near the center where more spacers are provided. In other words, there is a potential for substantial undesirable variation near the edges relative to center areas of the unit. If the gap or thickness of the low pressure space 11 between the substrates is lower or higher at an edge than proximate the center of the unit, then the edge seal and/or glass substrate (s) can have higher stress than if the gap is approximately equal throughout the unit. The higher the stress, the more likely it is for either of the glass substrates to crack or break, and the more likely it is for the edge seal to delaminate. Furthermore, this may cause certain pillars 5 to dig into a substrate 2 (or 3) more than other pillars 5 due to stress differences.

It is apparent from the above that there exists a need in the art for a vacuum IG unit, and corresponding method of making the same, designed so as to reduce the potential for significant gap variation between two substrates.

This invention will now be described with respect to certain embodiments thereof, accompanied by certain illustrations.

SUMMARY OF THE INVENTION

An object of this invention is to provide a vacuum insulating glass (IG) unit including first and second peripheral or edge seals, and at least one spacer or pillar provided at least partially between the first and second edge seals.

Another object of this invention is to fulfill any and/or all of the above-listed objects and/or needs.

Generally speaking, this invention fulfills any or all of the above described objects or needs in the art by providing a thermally insulating glass panel comprising:

first and second spaced apart glass substrates defining a low pressure space therebetween having a pressure less than atmospheric pressure;

a first plurality of spacers disposed between said first and second glass substrates for spacing said substrates from one another in order to maintain said low pressure space therebetween;

first and second edge seals; and a second plurality of spacers for spacing said substrates from one another, at least some of said spacers of said second plurality being disposed at least partially between said first and second edge seals.

DETAILED DESCRIPTION OF CERTAIN EMBODIMENTS OF THIS INVENTION

Figure 1:
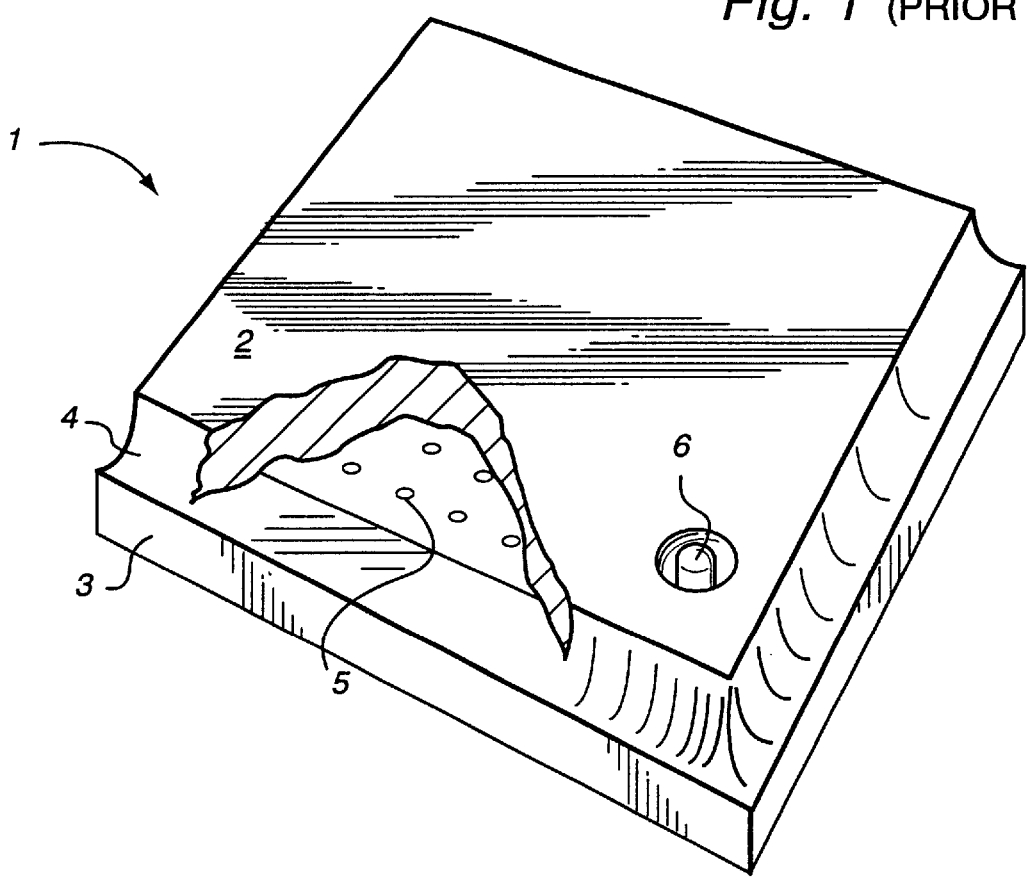
FIG. 1 is a prior art partial cutaway perspective view of a conventional vacuum IG unit.

Referring now more particularly to the accompanying drawings in which like reference numerals indicate like parts throughout the several views.

Certain embodiments of this invention relate to a peripheral or edge sealing system in a vacuum IG window unit, and/or a method of making the same. In some embodiments, the sealing system includes a peripheral seal with at least one spacer or pillar therein or in contact therewith. In other embodiments, at least first and second edge seals are provided and spacer(s) are located at least partially between the first and second edge seals. This enables the gap or space between the two glass substrates to be better controlled with regard to thickness, thereby reducing the likelihood of glass breakage or cracking due to high stress conditions. "Peripheral" and "edge" seals herein do not mean that the seals are located at the absolute periphery of the unit, but instead mean that the seal is at least partially located at or near (e.g., within about three (3) inches) an edge of at least one substrate of the unit.

Figure 3:
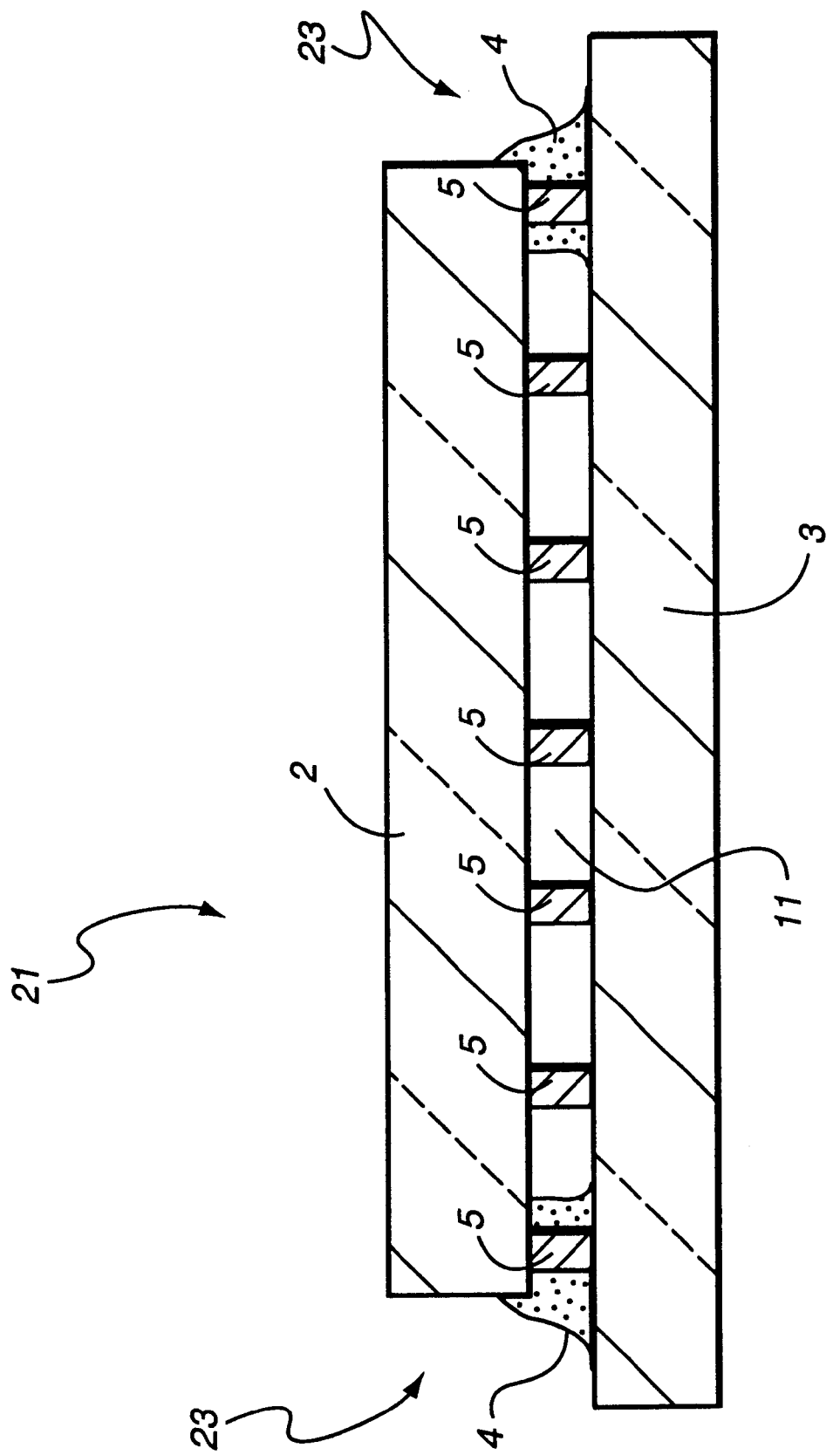
FIG. 3 is a side cross sectional view of a vacuum IG unit according to an embodiment of this invention.

FIG. 3 is a cross sectional view of thermally insulating glass panel 21 according to an embodiment of this invention. Because interior space 11 between the opposing substrates is at a pressure lower or less than atmospheric in general, this type of panel is often referred to as a vacuum insulating glass (IG) unit.

Vacuum IG unit or panel 21 includes a first glass substrate 2, second glass substrate 3, low pressure or evacuated space 11 between substrates 2 and 3, spacers (or pillars) 5 for spacing the substrates 2, 3 from one another and supporting them, an optional pump out tube (not shown) disposed in a hole or aperture formed in substrate 2 for evacuating space 11, and peripheral or edge sealing system 23 that hermetically seals low pressure space 11 between substrates 2, 3 and/or bonds the substrates to one another or holds them together. Sealing system 23 may include one or more different seals in different embodiments of this invention. It is noted that while substrates 2, 3 are preferably of glass in certain embodiments of this invention, they need not be and can be of other material (e.g., plastic) in other embodiments of this invention.

In the FIG. 3 embodiment, sealing system 23 includes sealing material 4 as well as at least one spacer/pillar 5 provided therein. Such spacer/pillars 5 of the sealing system may be dispersed throughout and at least partially surrounded by seal material 4. In certain embodiments, lateral sides of spacers 5 in sealing system 23 are entirely surrounded by and contacting seal material 4 so that they are embedded therein. The provision of spacers 5 within or adjacent seal material 4 enables the gap between the substrates to be better controlled at edges of the unit, thereby reducing the likelihood of glass breakage or cracking due to high stress conditions. These seal embedded spacers support the substrates relative to one another proximate edges thereof.

Vacuum IG units 21 according to different embodiments of this invention may be used as residential or commercial windows. The evacuation of space 11 eliminates or reduces heat transport between glass substrates 2 and 3 due to gaseous conduction and convection. In addition, radiative heat transport between glass sheets 2 and 3 can be reduced to a low level by providing a low emittance (low-E) coatings (s), not shown, on a surface of one or both of sheets 2, 3. High levels of thermal insulation can thus be achieved. Low gaseous thermal conduction may be achieved when, for example, the pressure in space 11 is reduced to a level equal to or below about $0.5 \times 10^{-3}$ Torr, more preferably below about 0.1 mTorr, or $10^{-4}$ Torr, and most preferably below about $10^{-6}$ Torr of atmospheric pressure. The hermetic sealing system 23 substantially eliminates any ingress or outgress of gas or air to/from space 11. In preferred embodiments, the pressure of low pressure space 11 is less than atmospheric pressure.

In certain embodiments of this invention, hermetic sealing material 4 may be made of or include any of the following materials: solder glass, indium, Ostalloy 313-4, 99% indium (In) wire available from Arconium (Providence, R.I.), liquid glass (i.e., glass composition with water in it when applied, wherein the water evaporates when heated to form the inner seal portion 45), rubber, silicone rubber, butyl rubber, Indalloy No. 53 available from Indium Corp. in paste form having a composition of 67% Bi and 33% In (% by weight), Indalloy No. 1 from Indium Corp. in paste form having a composition of 50% Sn, Indalloy No. 290 available from Indium Corp. in paste form having a composition of 97% In and 3% Ag, Indalloy No. 9 from Indium Corp. in paste form having a composition of 70% Sn, 18% Pb and 12% In, Indalloy No. 281 available from Indium Corp. in paste form having a composition of 58% Bi and 42% Sn, Indalloy No. 206 available from Indium Corp. in paste form having a composition of 60% Pb and 40% In, Indalloy No. 227 available from Indium Corp. in paste form having a composition of 77.2% Sn, 20% In, and 2.8% Ag, Indalloy No. 2 available from Indium Corp. in paste form having a composition of 80% In, 15% Pb and 5% Ag, Indalloy No. 3 available from Indium Corp. in paste form having a composition of 90% In and 10% Ag, or any other suitable material.

Still referring to FIG. 3, the array of spacers or pillars 5 is provided between substrates 2 and 3 in order to maintain separation of the two approximately parallel glass sheets against atmospheric pressure. It is often desirable for spacers 5 to be sufficiently small so that they are visibly unobtrusive. In certain embodiments, each spacer (those in contact with the sealing system and those not in contact with the sealing system) may have a height of from about 0.10 to 0.50 mm. Spacers 5 may be made of or include solder glass, polymer (e.g., Teflon), plastic, ceramic, glass, metal, or any other suitable material. These spacers or pillars 5 may take the form of any number of geometric shapes. For example, spacers or pillars 5 may be spherical, cylindrical, square, rectangular, rod-like, bead-like, oval, trapezoidal, or the like.

In certain embodiments, all spacers/pillars 5 are of approximately the same size and/or material (i.e., those in seal material 4 are approximately the same size/material as those not contacting the seal material). However, in other embodiments of this invention, spacers/pillars 5 in seal material 4 may be of a smaller or larger size than those not in sealing material 4. In still further embodiments, there may be multiple different sizes of spacers 5 in seal material 4.

Figure 2:
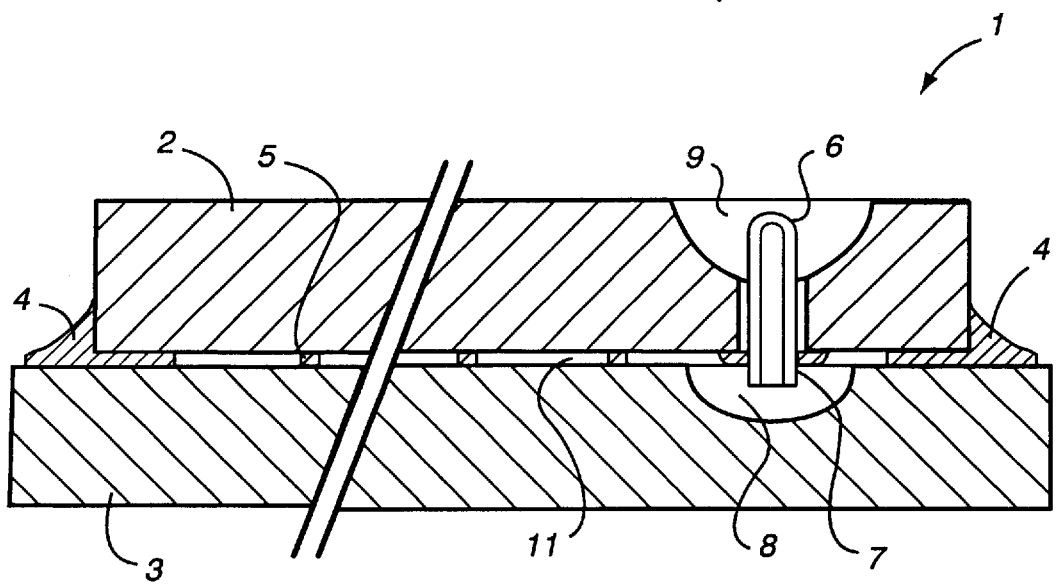
FIG. 2 is a prior art partial cross sectional view of the FIG. 1 vacuum IG unit.

An exemplary non-limiting method making a vacuum IG window unit according to an embodiment of this invention is provided below with regard to FIG. 3. Initially, hermetic seal material is provided in slurry, powder or liquid form. A plurality spacers/pillars 5 are dispensed into the seal material and the two are mixed together to form a sealing mixture. The sealing mixture inclusive of spacers 5 and material 4 is then dispensed or printed onto a major surface of glass substrate 3 proximate an edge or periphery thereof. An array of additional spacers/pillars 5 is then positioned within the boundary defined by the mixture on the same major surface of substrate 3 (i.e., in a more central area of the substrate). Second substrate 2 is then brought down on top of pillars 5 and the peripheral sealing mixture, the two substrates 2, 3 then being pressed together with the spacers in the central area of the unit and in the sealing material proximate edges maintaining space between the two substrates. The entire unit is then heated, and permitted to go through a curing/cooling process (e.g., to about 480–520 degrees C. for a period of eight (8) hours including ramp up and ramp down times). When seal material 4 cures, it may shrink to some degree. During such shrinking, spacers 5 in the sealing material 4 begin to support the substrate (s) 2, 3 proximate edges of the glass substrates (s). Following curing, space 11 is defined between the two substrates 2, 3, with the space being maintained by spacers 5 in both sealing system 23 and proximate the center of the unit. Thereafter, a vacuum may be attached to the vacuum tube (e.g., see FIG. 2) in order to evacuate space 11 thereby creating a vacuum IG window unit.

Figure 4:
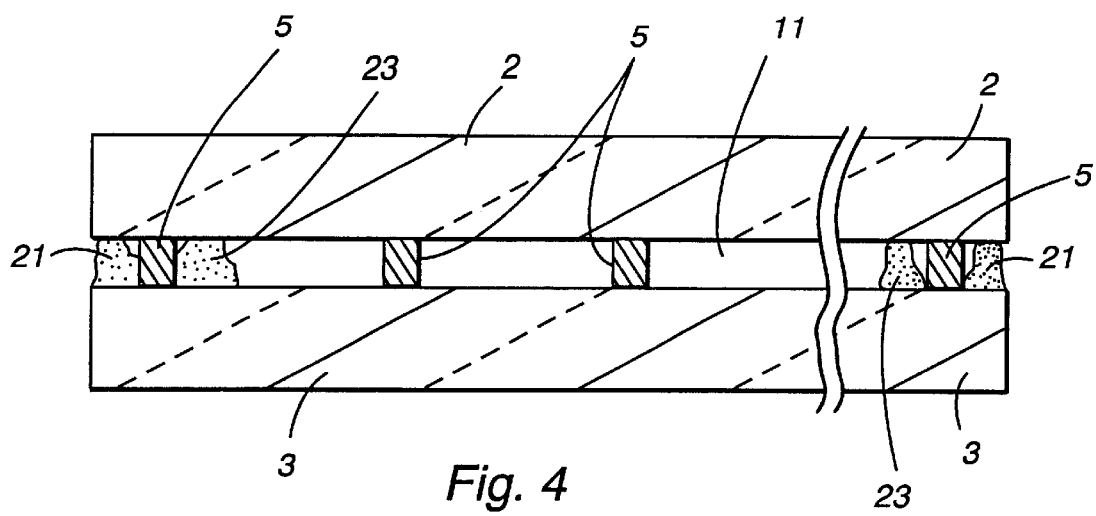
FIG. 4 is a side cross sectional view of a vacuum IG unit according to another embodiment of this invention.

FIG. 4 illustrates yet another embodiment of this invention. In the FIG. 4 embodiment, the edge sealing system includes first and second edge seals 21 and 23, respectively. The two edge seals 21 and 23 are of different materials in preferred embodiments, but may be of or include the same material in other embodiments. Inner edge seal 23 is located closer to the center of the vacuum IG unit than the adjacent outer edge seal 21, as illustrated in FIG. 4. In certain embodiments, inner edge seal 21 may be a hermetic seal for sealing off low pressure space 11, while outer edge seal 21 need not be hermetic but instead may be a stronger seal from a mechanical and/or structural perspective. In still further embodiments, both inner edge seal 23 and outer edge seal 21 may be hermetic type seals. In certain preferred embodiments of this invention, inner edge seal 23 may include or be made of, for example, Indium, fused solder glass, or any other seal material disclosed above. Meanwhile, outer edge seal 21 may be made of or include, for example, fuse solder glass, ceramic, polyvinyl butyral (PVB), or any other suitable material. Additionally, the inner and outer edge seals may be made of or include any of the respective seal materials disclosed in commonly owned U.S. Ser No. 09/416,886, filed Oct. 13, 1999, the disclosure of which is hereby incorporated herein by reference. The advantages of providing both an inner seal and an outer seal are discussed in the Ser. No. 09/416,886 application.

Figure 5:
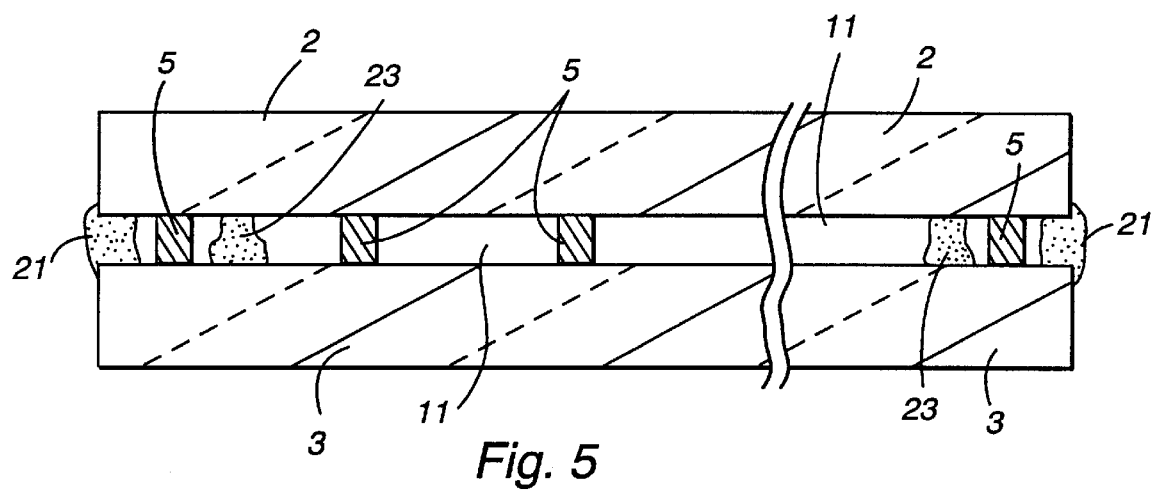
FIG. 5 is a side cross sectional view of a vacuum IG unit according to yet another embodiment of this invention.

As illustrated in the FIG. 4 embodiment, in addition to the first plurality of spacers 5 located at a central area of a vacuum IG unit, a second plurality of spacers 5 is/are located at least partially between the respective edge seals 21 and 23. The edge seals 21, 23 may contact the second plurality of spacers 5 as shown in FIG. 4, or in alternative embodiments the edge seals 21, 23 need not contact the second plurality of spacers 5 as shown in FIG. 5. In each of the FIG. 4 and FIG. 5 embodiments, a plurality of spacers or pillars 5 is provided at least partially between the respective edge seals 21 and 23. Moreover, in each of the FIG. 4 and FIG. 5 embodiments, the two edge seals 21 and 23 are spaced apart from one another. However, in certain preferred embodiments of this invention, at locations between spacers 5, the respective edge seals 21 and 23 may contact one another.

Figure 6:
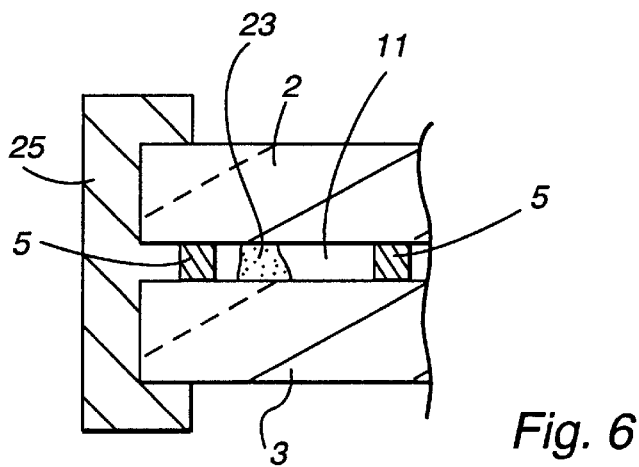
FIG. 6 is a side cross sectional view of a portion of a vacuum IG unit according to still another embodiment of this invention.

FIG. 6 illustrates yet another embodiment of this invention including first and second edge seals. As in the previous embodiments, inner edge seal 23 preferably completely surrounds space 11 (i.e., extends around the entire periphery of the space 11) while the outer edge seal may or may not extend all the way around the entire periphery of the space 11. Inner edge seal 23 is preferably a hermetic type seal (e.g., of indium, solder glass, or any other the other hermetic type seal materials discussed herein), while outer seal 25 is a mechanical type seal. Outer seal 25 may be of or include any of the respective outer seal materials disclosed in, for example, Ser. No. 09/416,886, the disclosure of which is hereby incorporated herein by reference. As shown in the FIG. 6 embodiment, inner edge seal 23 and outer edge seal 25 need not contact one another. However, in other embodiments of this invention, seals 23 and 25 may contact one another at locations between spacers 5 along or around the periphery of the vacuum IG unit.

In the FIGS. 4–6 embodiments, the seal for hermetic seal 23 may be applied to substrate 3 along with spacers 5 adjacent thereto (i.e., or exterior thereof) prior to the other substrate 2 being brought up against them. The material for seal 21 may be deposited prior to bringing the other substrate 2 to rest on the top of spacers 5 and/or seals 21, 23, or alternatively the material for seal 21 may be deposited after seal 23 has been formed as after the spacers proximate the seal have been deposited.

Once given the above disclosure, many other features, modifications, and improvements will become apparent to the skilled artisan. Such other features, modifications, and improvements are, therefore, considered to be a part of this invention, the scope of which is to be determined by the following claims.

What is claimed is:

1. A thermally insulating glass panel comprising:

first and second spaced apart glass substrates defining a low pressure space therebetween having a pressure less than atmospheric pressure;

a first plurality of spacers disposed between said first and second glass substrates for spacing said substrates from one another in order to maintain said low pressure space therebetween;

an edge sealing system including first and second seals of different materials; and a second plurality of spacers, wherein at least some of said spacers of said second plurality are located at least partially between said first and second seals.

2. The glass panel of claim 1, wherein said at least some of said spacers of said second plurality are of a different size than spacers of said first plurality.

3. The glass panel of claim 1, where said first and second seals are spaced apart from one another in at least one area.

4. The glass panel of claim 1, wherein said spacers of said first and second pluralities include at least one of a metal, a plastic, a ceramic, and a glass.

5. A thermally insulating panel comprising:

first and second spaced apart substrates defining a low pressure space therebetween having a pressure less than atmospheric pressure;

first and second edge seals located proximate an edge or peripheral portion of the panel, said first and second edge seals being spaced apart from one another; and at least one spacer located at least partially between said first and second edge seals.

6. The panel of claim 5, wherein said first and second edge seals are of different materials.

7. The panel of claim 5, wherein said first edge seal comprises a hermetic seal and said second edge seal is not a hermetic seal.

8. The panel of claim 7, wherein said first edge seal is closer to a central portion of the panel than said second edge seal.

9. The panel of claim 8, wherein said second edge seal has greater mechanical strength than said first edge seal.

10. The panel of claim 5, wherein portions of said first and second edge seals contact one another.

11. The panel of claim 5, wherein said first and second edge seals are approximately concentric relative to a center of the panel.

12. The panel of claim 1, wherein at least one of said seals comprises solder glass.

13. The panel of claim 5, wherein at least one of said seals comprises solder glass.

* * * * *